J. F. KIENZLE.
CORN SHELLING MACHINE.
APPLICATION FILED MAR. 20, 1915.
1,155,155.
Patented Sept. 28, 1915.
2 SHEETS—SHEET 1.
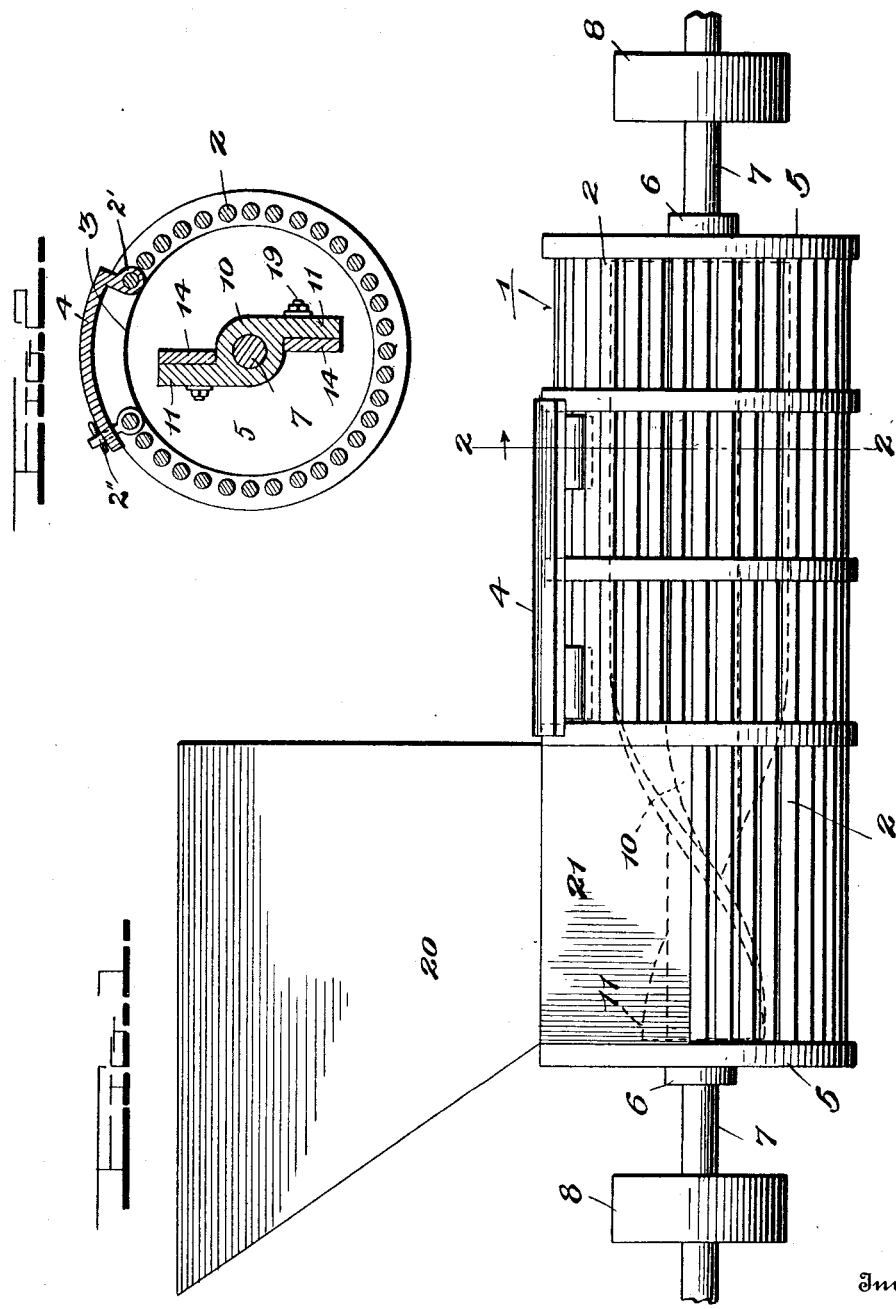
Witnesses
Inventor
Jacob F. Kienzle
By
Albert M. Freeman
Attorney

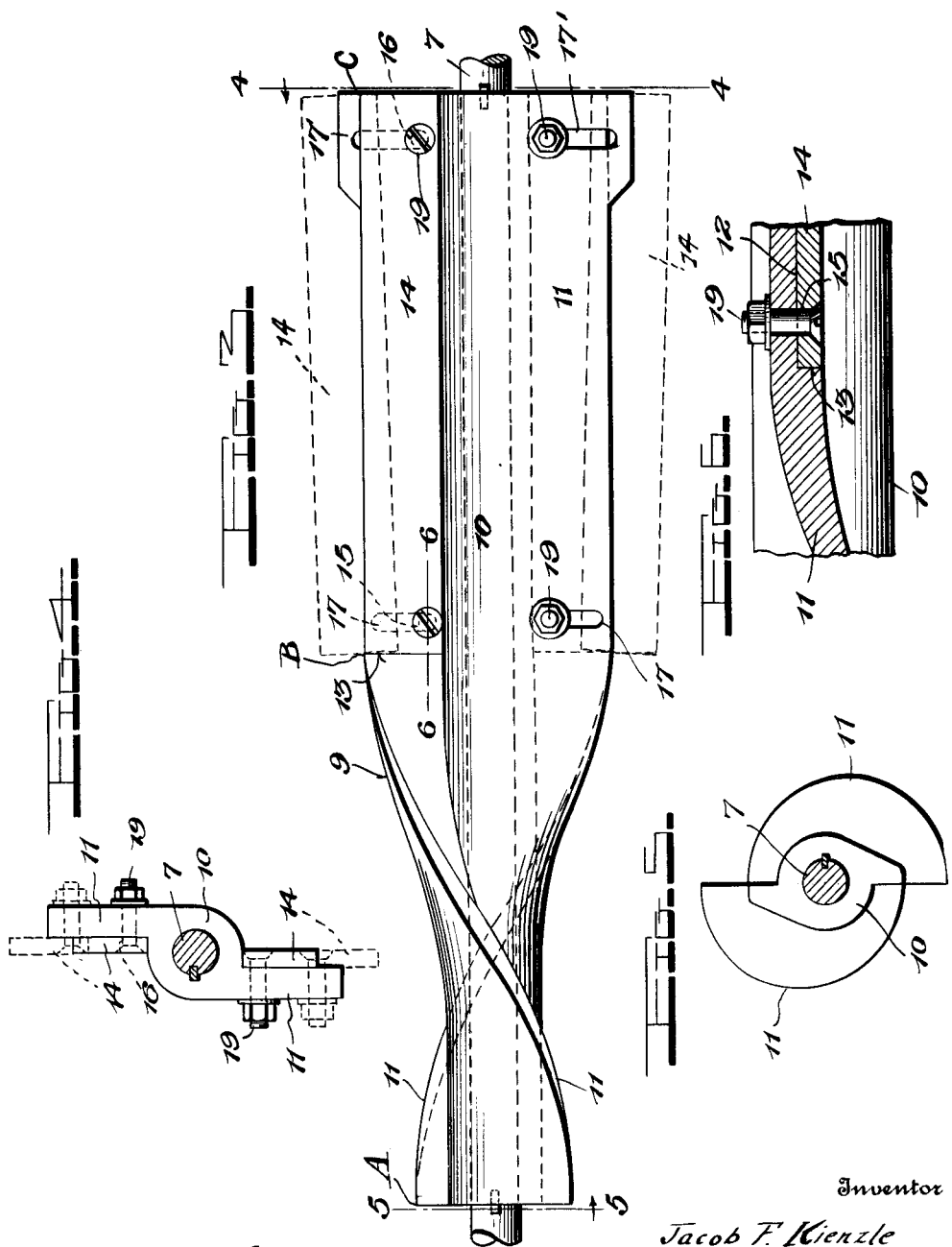

UNITED STATES PATENT OFFICE.

JACOB F. KIENZLE, OF SIOUX FALLS, SOUTH DAKOTA.

CORN-SHELLING MACHINE.

1,155,155.  Specification of Letters Patent.  Patented Sept. 28, 1915.

Application filed March 20, 1915. Serial No. 15,945.

*To all whom it may concern:*

Be it known that I, JACOB F. KIENZLE, a citizen of the United States, residing at Sioux Falls, in the county of Minnehaha and State of South Dakota, have invented new and useful Improvements in Corn-Shelling Machines, of which the following is a specification.

The present invention is directed to improvements in corn shelling machines, and has for its object to provide an improved machine of this type wherein corn can be fed thereto on the cobs and the kernels effectively removed.

Another object of the invention is to provide a sheller so constructed that the same can be easily and quickly adjusted for shelling ears of varying sizes.

A further object of the invention is to provide a sheller capable of adjustment within the cylinder so as to effectively shell corn that is dry or damp.

A still further object of the invention is to produce a corn shelling machine, the cylinder or cage of which is provided with an opening so that access may be had to the sheller to adjust the plates carried thereby, whereby the plates can be moved radially toward or away from the interior of the cylinder so as to effectively shell ears of various sizes regardless of whether the same are dry, moist or wet.

In the drawings: Figure 1 is a side elevation of the cylinder, the sheller being shown in dotted lines; Fig. 2 is a sectional view on the line 2—2 of Fig. 1; Fig. 3 is a side elevation of the sheller; Fig. 4 is a sectional view on the line 4—4 of Fig. 3; Fig. 5 is a similar view on the line 5—5 of Fig. 3; and Fig. 6 is a similar view on the line 6—6 of Fig. 3.

Referring to the drawings, 1 represents the cylinder or cage, which is of any conventional type or form. A number of the bars 2 of the cage are omitted to provide a doorway 3, normally closed by a door 4 which is hingedly connected to one of the bars at 2', and may be locked to the bar at the opposite side of the doorway by a catch 2".

The end plates 5 of the cage are provided with bearings 6, which are disposed in alinement and journaled in these bearings is a shaft 7, having rotatable movement imparted thereto by either one of the two band pulleys 8.

The sheller 9, which coacts with the surrounding bars of the cage 1, consists of a hub 10 keyed to the shaft 7 and having blades 11 formed integral therewith. The blades 11 are spirally arranged from the point A to point B, while the portions thereof from the point B to point C are disposed in parallel longitudinal alinement with the hub. Those portions of the blades between the points B and C are offset with relation to the longitudinal axis of shaft 1 and are arranged in parallelism as shown in Fig. 4.

One of the side faces of the blades 11, between points B—C are formed with cutaway parts 12 that provide resultant shoulders 13, against which latter abut the rear ends of plates 14, which are adjustably mounted in the cutaway parts 12 so as to be capable of movement radially of the hub 10.

The plates 14 are adjustable radially of the blades 11 and can be regulated so as to have their free side edges disposed at an inclination to the longitudinal axis of the shaft 7 as shown in dotted lines in Fig. 3 which adjustment is readily accomplished, due to the fact that slots 17 and 17', of varying lengths, are formed transversely of the blades 11 and loosely receive bolts 19 that pass loosely therethrough so as to enable the plates to be diagonally adjusted, the bolts passing through openings 15 and 16 formed in the plates 14. The slot 17' is slightly greater in length than the slot 17, whereby said plates can be moved to the position shown in dotted lines in Fig. 3, and at which time their outer edges are extended beyond the edges of the blades 11. Thus it will be seen that the blades are capable of being adjusted radially of the hub 10 and toward or away from the interior wall of the cage 1, whereby the sheller will effectively shell ears of various sizes and conditions. The slots 17 and 17' of blades 11 register with the perforations 15 and 16, to receive the clamping bolts 19 which hold the plates 14 in different adjusted positions.

By adjusting the plates 14 at an inward incline with respect to the longitudinal axis of the hub 10 it is obvious that the same will act to slowly feed the ears, which are introduced into the cage toward the outlet from which point the ears may be removed. The plates 14 may be readily adjusted upon opening the door 4, which latter permits access to the cage 1 to clear the machine.

The ears are fed from the hopper 20 to the cage 1, and as the sheller revolves, the ears will be constantly agitated, and forced into contact with the bars 2 thereby removing the kernels from the ears, the kernels falling between the bars 2. The cobs will be slowly fed toward the front end of the cage by the spiral portions of the blades 11 to be thoroughly acted upon by the adjustable plates 14, and are subsequently removed through the doorway 3.

What is claimed is:

1. A corn sheller, a cage, and a sheller rotatable in the cage, said sheller having radial blades which are spirally disposed from one end of the sheller to points approximately midway of the length of the sheller and from said points extend parallel with the longitudinal axis of the sheller, and angularly adjustable plates carried by said parallel parts of the blades and extending from said midway points to the opposite end of the sheller.

2. In a device of the class described, a cage, a shaft rotatably mounted in the cage, a hub fixed to the shaft and having integral blades extending longitudinally thereof, said blades having cutaway parts formed therein, providing shoulders at one of their ends, plates mounted in the cutaway parts and having their inner ends abutting the shoulders, said blades being adjustable in the cutaway parts at different angular relations to the hub, and means for holding the blades in adjusted positions.

In testimony whereof I have hereunto set my hand in presence of two subscribing witnesses.

JACOB F. KIENZLE.

Witnesses:
R. D. KITINGE,
E. M. BARRINGER.